US012404904B2

(12) United States Patent
Ostyn

(10) Patent No.: US 12,404,904 B2
(45) Date of Patent: Sep. 2, 2025

(54) CLUTCH, INDUSTRIAL ROBOT AND THE USE THEREOF

(71) Applicant: Universiteit Gent, Ghent (BE)

(72) Inventor: Frederik Ostyn, Oeselgem (BE)

(73) Assignee: Universiteit Gent, Ghent (BE)

( * ) Notice: Subject to any disclaimer, the term of this patent is extended or adjusted under 35 U.S.C. 154(b) by 0 days.

(21) Appl. No.: 18/041,697

(22) PCT Filed: Aug. 6, 2021

(86) PCT No.: PCT/EP2021/072043
§ 371 (c)(1),
(2) Date: Feb. 15, 2023

(87) PCT Pub. No.: WO2022/043028
PCT Pub. Date: Mar. 3, 2022

(65) Prior Publication Data
US 2023/0287943 A1 Sep. 14, 2023

(30) Foreign Application Priority Data
Aug. 25, 2020 (EP) .................................... 20192582

(51) Int. Cl.
*F16D 43/206* (2006.01)
*B25J 9/10* (2006.01)
(Continued)

(52) U.S. Cl.
CPC .......... *F16D 43/206* (2013.01); *B25J 9/1025* (2013.01); *B25J 9/1602* (2013.01); *B25J 19/063* (2013.01);
(Continued)

(58) Field of Classification Search
CPC ........ F16C 17/02; F16C 19/362; F16D 7/021; F16D 7/08; F16D 43/211; F16D 43/206; B25J 9/1025; B25J 9/1602; B25J 19/063
See application file for complete search history.

(56) References Cited

U.S. PATENT DOCUMENTS 2,875,601 A * 3/1959 Georges .................... F16D 7/08
464/36
3,774,738 A * 11/1973 Steinhagen ........... F16D 43/206
464/36

(Continued)

FOREIGN PATENT DOCUMENTS

JP   H02122221 U   10/1990
JP   2008002589 A   1/2008

*Primary Examiner* — Lori Wu
(74) *Attorney, Agent, or Firm* — Ipsilon USA—NLO

(57) ABSTRACT

A clutch comprising a hub and a cam connected to the hub, said cam comprising a ring-shaped part having grooves formed on a bottom surface of the ring-shaped part; a spring plate having recesses formed on a top surface of the spring plate; an output flange and a part of a roller bearing connected to each other, said output flange comprising a ring-shaped part configured to accommodate the spring plate, a plurality of transmission elements arranged in an angular direction between the spring plate and the cam; a plurality of springs arranged in the angular direction between the spring plate and the output flange; and a sliding bearing provided at an interface between the hub and the output flange, wherein the clutch is configured to be changed between first and second states. A high-speed industrial robot capable of moving on a plurality of axes, and use thereof.

18 Claims, 4 Drawing Sheets

Fig. 1

(51) Int. Cl.
  *B25J 9/16* (2006.01)
  *B25J 19/06* (2006.01)
  *F16C 17/02* (2006.01)
  *F16C 19/36* (2006.01)
  *F16D 43/21* (2006.01)

(52) U.S. Cl.
  CPC ............ *F16C 17/02* (2013.01); *F16C 19/362* (2013.01); *F16D 43/211* (2013.01)

(56) References Cited

U.S. PATENT DOCUMENTS

2018/0172080 A1* 6/2018 Jackowski ............... B25J 19/06
2019/0010996 A1* 1/2019 Stegmann ............. B64C 13/341

* cited by examiner

CLUTCH, INDUSTRIAL ROBOT AND THE USE THEREOF

FIELD OF THE INVENTION

The present invention relates to a clutch and an industrial robot comprising the clutch. The present invention further relates to a use of a clutch for protecting a robot in a position-based application from torque overload.

BACKGROUND

Industrial robots capable of moving a plurality of axes have seen increased use. In position-based applications, high-speed industrial robots have been more attractive. High-speed industrial robots are traditionally designed to have a higher mechanical stiffness compared to other industrial robots such as collaborative robots. This increases precision, stability and bandwidth which allows for more accurate tracking of a desired trajectory. This often results in a heavier design with higher kinetic energy when moving at high speeds, which significantly increases the severity of a collision. A collision can occur due to programming errors of the robots or changes in the environment of the robots. One consequence of a collision is torque overload which can cause breakdown of the robot and any external and internal parts of the robot, such as a motor, gear, spindle, etc. i.e. the drive train parts which allow the robot move.

Typically, clutches are used to protect the application and the robot (incl. its drive train) in said application by decoupling a rotational movement from the motor in the drive train to the gear and the spindle when the torque exceeds a limit. A friction clutch is one type of clutch where an input and an output side are held together due to friction forces between the input and output flanges. When the torque on either input or output flange increases beyond the clutch torque (e.g. due to a collision), decoupling occurs. Unfortunately, the relative position of the input and output of the clutch is shifted and, thus, lost. Therefore, for a robot in a position-based application, recalibration is needed to take this relative position shift into account.

A ball-spring-cam clutch is another type of clutch in clutches, which allows a unique return position. However, when decoupling occurs, residual torque that can be transmitted to the load is minimal. Unfortunately, this is not applicable to industrial robots since the weight of the robots would cause them to collapse when the load is completely decoupled from the motor. For example, U.S. Pat. No. 10,436,261 B2 describes disconnecting an overload clutch, comprising a hub which has axially directed hub recesses arranged on the periphery thereof, a pressure flange mounted on the hub in a rotatable manner with axially directed pressure flange depressions. The switch element has axially projecting switch element cams facing the front-end exposed surface thereof, which in the engaged state transfer the force of the spring elements to the transmission bodies and thus axially engage with the hub recesses. When disengaging, the switch element experiences an axial displacement and rotary movement with the switch element cams in relation to the hub, so that the switch element cams are transferred into a position wherein same transfer the force of the spring elements only onto a support surface of the hub with the result that the clutch can freely come to a stop.

WO 2012/101504 A1 describes a safety coupling which, in the event of an overload, when an adjustable overload torque is exceeded, is disengaged from a defined driving position into freewheeling (or residual torque) and remains therein until being reset into the driving position by means of a resetting element.

It has been found that despite efforts to provide a clutch that protects a robot from torque overload, there is still a need to prevent the robot from dropping a weight it is holding, i.e. to ensure that the robot is able hold a weight in any position, after decoupling. Moreover, there is a need to precisely return to the previous relative coupling position while holding such a weight.

OBJECT OF THE INVENTION

An object of the invention is to provide a clutch that overcomes the above mentioned disadvantages.

Another object of the invention may be to provide a clutch that ensures holding a weight in any position after decoupling without any intervention from a human operator or external tools.

Another object of the invention may be to provide a clutch that ensures reliable and reproducible results of returning the clutch to a predetermined return position.

SUMMARY OF THE INVENTION

This object is achieved by a clutch comprising a hub, extending in an axial direction, and a cam rigidly connected to each other. The cam comprises a ring-shaped part extending in a radial direction, perpendicular to the axial direction, said ring-shaped part having grooves formed on a bottom surface of the ring-shaped part. The grooves being arranged in an angular direction and each groove being configured to accommodate a top part of a transmission element.

The clutch further comprises an output flange, a spring plate and preferably a part of a roller bearing. The spring plate has recesses formed on a top surface, said recesses being arranged in the angular direction and each recess being configured to accommodate a bottom part of the transmission element. The output flange and a part of the roller bearing may be rigidly connected to each other. The output flange comprises a ring-shaped part configured to accommodate the spring plate.

The clutch further comprises a plurality of transmission elements arranged in the angular direction between the spring plate and the cam, and a plurality of springs arranged in the angular direction between the spring plate and the output flange. The plurality of springs allow the spring plate to move axially with respect to the output flange and/or the cam.

The clutch is configured to be changed between: a first state in which the springs push the spring plate against the cam in the axial direction to engage the cam at a predetermined position and in which the transmission element are provided in spaces defined by the recesses of the spring plate and the grooves of the cam such that during use torque is transmitted to the output flange via the cam and the transmission elements, and a second state in which the transmission elements are provided in the recesses of the spring plate and engage the ring-shaped part of the cam between subsequent grooves and in which the cam and spring plate are separated from each other. For example, when the torque at the cam exceeds a predetermined torque threshold, the transmission elements move out of the grooves and onto flat areas arranged between subsequent grooves in the angular direction, and disengage the spring plate and the cam from each other.

The clutch further comprises a sliding bearing provided at an interface between the hub and the output flange. The clutch is configured to, during use, be moved from the first state to the second state upon the transmitted torque exceeding a clutch threshold torque. The clutch is configured to, during use in the second state, provide a predetermined friction between the transmission elements and the surface of the cam, between the sliding bearing and the output flange, or preferably the combination thereof, such that the resulting friction torque, between the output flange and the hub, prevents the output flange and the hub to rotate freely from each other.

The predetermined friction torque is at least 1% of the clutch threshold torque. In embodiments, the predetermined friction torque is at least 5% of the clutch threshold torque, and preferably ranges from 5 to 50% of the clutch threshold torque. More preferred ranges of the clutch threshold torque are from 5 to 40%, 5 to 35%, 5 to 30%, 10 to 50%, 10 to 40%, 10 to 35%, 10 to 30%, 20 to 50%, 20 to 40%, 20 to 35%, and 20 to 30%. The predetermined friction torque is even more preferably 25% of the clutch threshold torque.

As such, due to the friction between the transmission elements and the surface of the cam and between the sliding bearing and the output flange create a relatively high percentage of torque remains in the second 'disengaged' state, this residual torque prevents the output flange and the hub to rotate freely from each other. Hence, sufficient torque remains to support the weight of the load. In particular, a sliding bearing and transmission elements engaging with the ring-shaped part of the cam generate friction forces and in the end torque which ensures that the weight of a load, for e.g. an industrial robot arm, can be partially supported, to allow for a safe return to a predefined position of said load.

This predefined position may be provided by the arrangement of the transmission elements and the grooves improving the return position of the cam relative to the spring plate and/or the output flange. In this manner, in contrast to WO 2012/101504 A1 there is no loss of return position and there is a residual torque that ensures as support of the load to allow for a returning of the clutch to a predetermined position which can be reproducible.

Furthermore, it has been shown that limiting the rotation of the cam with respect to the output flange ensures improved and reproducible results of returning to the predetermined position.

The clutch, during use, may be further configured to be moved from the second state to the first state upon a relative movement of the hub and output flange such that the transmission elements are accommodated within the grooves in the cam and the springs push the spring plate against the cam.

According to an embodiment, the present invention relates to the clutch as described above, wherein the predetermined frictional torque is adjustable by changing at least one of a type or shape of the springs, a number of the springs, a pre-compression of the springs, a friction coefficient of the sliding bearing and a diameter of the sliding bearing.

According to another embodiment, the present invention relates to the clutch as described above, wherein the plurality of springs extend through the output flange in the axial direction between the spring plate and the first part of the roller bearing.

According to yet another embodiment, the present invention relates to the clutch assembly as described above, the clutch further comprises an end-stop integrated in a second part of the roller bearing, the said end-stop being configured to limit a rotation of the cam with respect to the output flange to a predetermined angle and allow said springs to re-engage the spring plate and the cam at a predetermined position. According to further embodiment, the integrated end-stop is an internal pin and/or the predetermined angle is between −175° and +175°.

In an embodiment, the present invention relates to the clutch as described above, wherein the transmission elements and the grooves are arranged in a plurality of groups based on a size of the spring plate and the cam, on a size and a number of the transmission elements and the grooves, and/or on the predetermined position, preferably a number of the transmission elements and the grooves in each group of the plurality of groups is the same.

In another embodiment, the present invention relates to the clutch as described above, the clutch further comprises one or more sliders configured to allow the spring plate to be displaced in the axial direction.

In embodiments, the present invention relates to the clutch as described above, wherein the roller bearing is a cross roller bearing, the hub is a clamping bushing configured to lock the clutch to a shaft and/or the transmission elements are balls.

The present invention also relates to the use of the clutch as described above in protecting a robot in a position-based application from torque overload.

The present invention further relates to an industrial robot capable of moving on a plurality of axes comprising the clutch as described above. The industrial robot further comprises a gear unit connected to the hub and a motor connected to the gear unit, said motor being configured to provide torque to the hub through the gear unit, wherein the gear unit may be a strain wave gearing, preferably a harmonic drive. The present invention even further relates to the use of an industrial robot as described above in a control algorithm comprising the step of actively braking the motor when the torque provided to the outlet flange exceeds a predetermined torque threshold.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The invention will be explained in more detail below with reference to drawings in which illustrative embodiments thereof are shown. They are intended exclusively for illustrative purposes and not to restrict the inventive concept, which is defined by the appended claims.

DETAILED DESCRIPTION OF THE DRAWINGS

Figure 1:
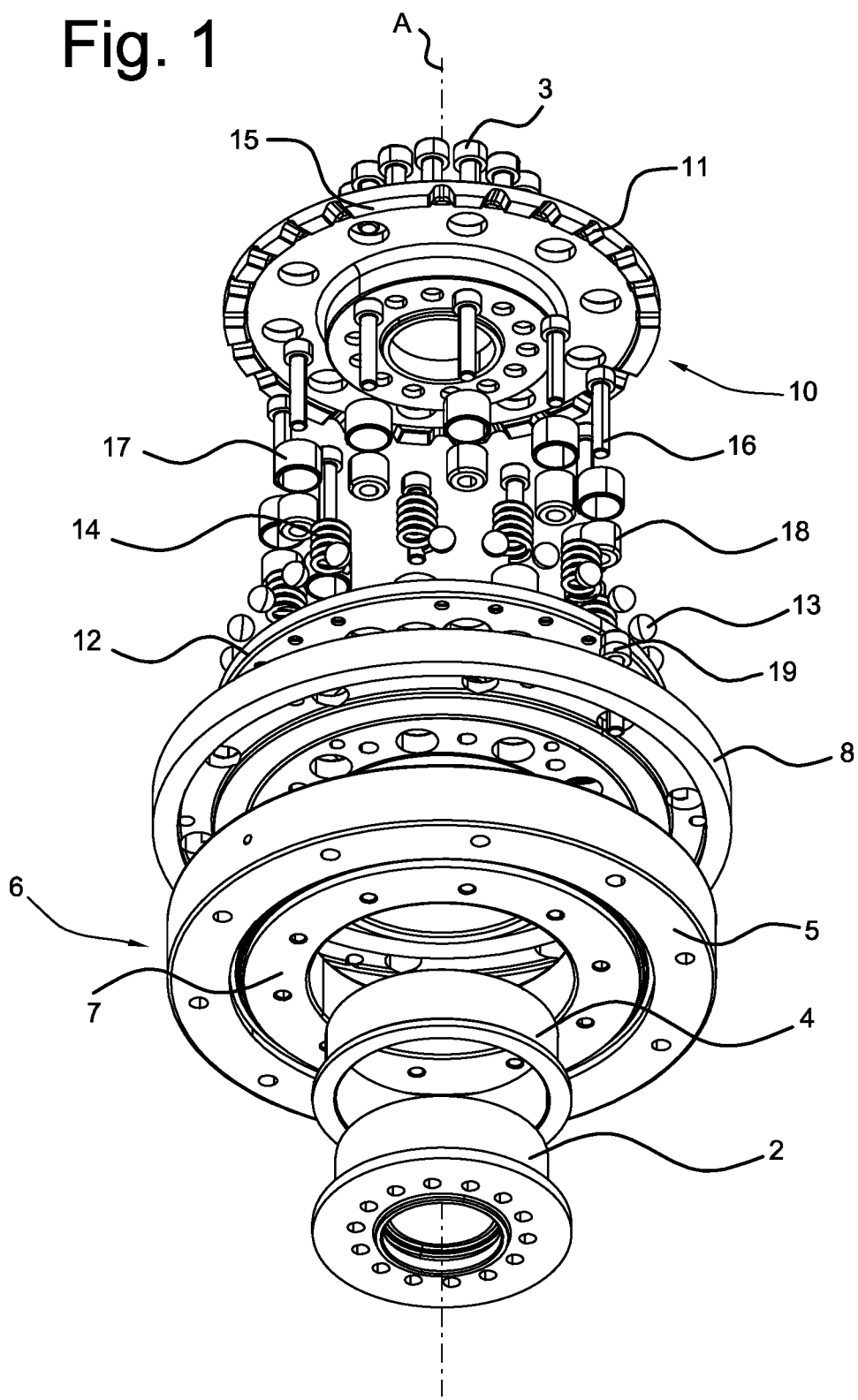
FIG. 1 schematically shows an exploded perspective view of a clutch according to the present invention.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the disclosure may be implemented rather than as limiting the scope of the disclosure.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present disclosure, the only enumerated components of the device are A and B, and further the claim should be interpreted as including equivalents of those components.

Different aspects of the present disclosure will be described more fully hereinafter with reference to the enclosed drawings. The embodiments disclosed herein can, however, be realized in many different forms and should not be construed as being limited to the aspects set forth herein.

Figure 2A:
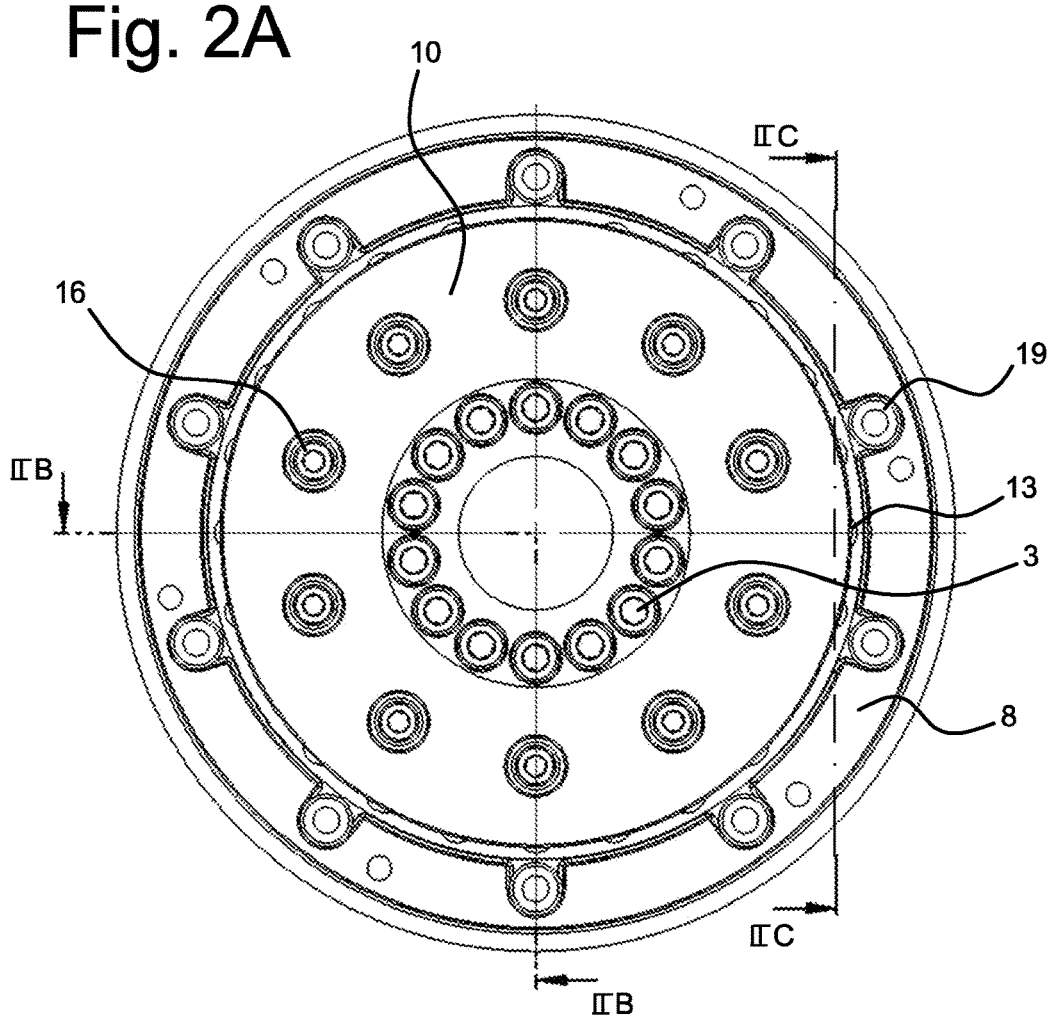
FIGS. 2A and 2B schematically show respectively a perspective view and a cross-sectional view of a clutch according to the present invention.
Figure 2B:
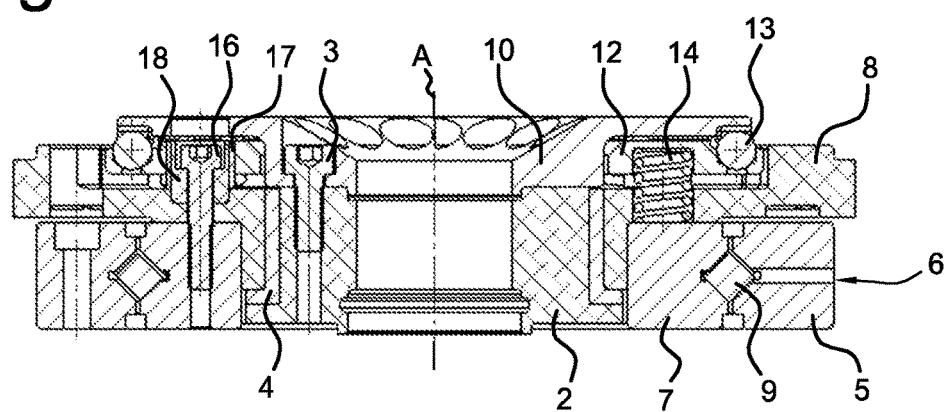
Figure 2C:
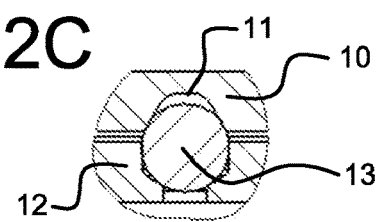
FIG. 2C schematically shows a cross-sectional view of a transmission element in the clutch of FIG. 2B.

Embodiments of a clutch according to the present invention will be described with reference to FIGS. 1 and 2A-2C. FIG. 1 schematically shows an exploded perspective view of a clutch. The clutch 1 comprises a hub 2, a sliding bearing 4, a roller bearing 6, an output flange 8, a cam 10, and spring plate 12, wherein the hub 2, the sliding bearing 4 and the cam 10 form an inner clutch part that is rotatable connected to an outer clutch part formed by the roller bearing 6, the outlet flange 8 and the spring plate 12. FIGS. 2A-2C schematically show the clutch shown in FIG. 1, where the parts of the clutch are connected and fastened to each other as will be described hereon in.

The hub 2, having a body of substantially tubular shape, extends in an axial direction A and may be connected, e.g. rigidly connected, or fastened to the cam 10 via first connection or fastening means 3, in the form of a bolt/screw connection with a bolt/screw stud, a bolt/screw connection with a through bolt/screw, a bolt/screw connection with a through bolt/screw and a nut. As shown in FIG. 1, the hub 2 comprises holes extending through the tubular body, arranged in an angular direction and configured to accommodate bolt connections through said holes of the hub 2. Furthermore, the hub 2 has an inlet flange extending outwardly from the tubular body to receive and support the sliding bearing 4.

It will be understood that the term "angular direction" may refer to an arrangement around axis A, for example a concentric arrangement around (a central) axis A.

The output flange 8 may be connected to a first shaft, such as the output shaft. Furthermore, the hub 2 may be suited to be connected to a second shaft, such as an input shaft. Said connections to the first and/or second shafts may be provided via connection or attachment means known in the art, for e.g. in the form of a press fit.

As shown in FIG. 1, the cam 10, having an annular shape body, also comprises holes arranged in the angular direction and configured to accommodate bolts/screws through said holes of the cam 10. The holes or openings of the cam 10 may be complementary to the holes or openings of the hub 2, for example having a similar diameter and/or arrangement. In an embodiment, the first connection or fastening means 3 may be accessible for adjustment (loosening and/or tightening) at a side of the cam 10. For example, the tail of the bolts/screws may be inserted into the holes of the cam 10 in the axial direction towards the hub 2, the bolts/screws being capable of adjustment at an end of the cam 10 (e.g. a top side of the cam 10) where a head of the bolts/screws is visible (as shown in FIG. 2A). Furthermore, the cam 10 has a recessed bottom area extending inwardly from the outer edge of the annular body to receive the spring plate 12.

As shown in FIG. 1, the output flange 8 is provided between the spring plate 12, the sliding bearing 4 and the roller bearing 6. The output flange 8 and a first part of the roller bearing 6 are connected, e.g. rigidly connected, or fastened to each other, for instance by a second connection or fastening means 16, in the form of a bolt/screw connection with a bolt/screw stud, a bolt/screw connection with a through bolt/screw, a bolt/screw connection with a through bolt/screw and a nut.

The second connection or fastening means 16 may be provided with sliders 17 through which the second connection or fastening means 16 may be inserted. The sliders 17 may be in the form of linear sliding bearings, linear sliders, bolt/screw sliders, etc. Support units 18 may be provided around part of the second connection or fastening means 16, such as around the tail of the bolts/screws. The support units 18 may be configured to provide mechanical support for the sliders 17. The sliders 17 may be further provided around the support units 18. The sliders 17 may be configured to allow the spring plate 12 to be displaced in the axial direction with respect to the output flange 8.

The spring plate 12 may comprise holes or openings arranged in the angular direction and configured to accommodate at least one of the second connection or fastening means 16, the sliders 17 and the support units 18. In embodiments, the support units 18 may be provided between the second connection or fastening means 16 and at least one of the holes or openings of the spring plate 12 and the sliders 17. In embodiments, the sliders 17 may be provided between the holes or openings of the spring plate 12 and at least one of the second connection or fastening means 16 and the support units 18. As shown in FIG. 1, the spring plate 12 comprises holes arranged in the angular direction and configured to accommodate bolt connections, bolt spacers and bolt bearings through said holes of the spring plate 12.

The output flange 8 comprises a ring-shaped part configured to accommodate the spring plate 12. As shown in FIG. 1, the output flange 8 also comprises holes arranged in the angular direction and configured to accommodate bolts/screws through said holes of the output flange 8. The holes or openings of the output flange 8 may be complementary to the holes or openings of the spring plate 12, for example having a similar diameter and/or arrangement. In embodiments, the diameter of the holes of the output flange 8 may be large enough to accommodate the second connection or fastening means 16 (i.e. between a smallest and largest diameter of the second a diameter of the support units 18). For example, the diameter of the holes of the output flange 8 is similar to a diameter of the tail of the bolts. In embodiments, the holes or openings of the output flange 8 may comprise two parts, a first part being on a first side of the output flange 8 facing the spring plate 12 (i.e., a top side of the output flange 8 or the ring-shaped part of the output flange 8) and a second part on a second side of the output flange 8 facing the roller bearing 6. A diameter of the first part may be larger than a diameter of the second part of the holes or openings of the output flange 8. Preferably, the diameter of the first part may be large enough to accommodate the second connection or fastening means 16 and the support units 18 (i.e. between a diameter of the support units 18 and the diameter of the sliders 17) and the diameter of the second part may be large enough to accommodate the second connection or fastening means 16 (i.e. between the smallest diameter of the second connection or fastening means 16 and the support units 18). For example, the diameter of the first part is similar to the diameter of the bolt spacers and the diameter of the second part is similar to the diameter of the tail of the bolts (as shown in FIG. 2A).

The holes or openings of the spring plate 12 may be complementary to the holes or openings of the output flange 8, preferably to the first part of the holes or openings of the output flange 8, for example having a similar diameter and/or arrangement. In an embodiment, the second connection or fastening means 16 may be accessible for adjustment (loosening and/or tightening) at a first side of the spring plate 12 opposite to a second side facing the output flange 8. For example, the tail of the bolts/screws may be inserted into the holes of the spring plate 12 in the axial direction towards and through the output flange 8, the bolts/screws being capable of adjustment at the first side of the spring plate 12 where the head of the bolts/screws is visible (as shown in FIGS. 2A and 2B).

As shown in FIG. 1, the roller bearing 6 comprises an outer ring 5, an inner ring 7 and a plurality of rollers 9 provided in between the outer ring 5 and the inner ring 7. The outer ring 5 and the inner ring 7 may comprise a ring-shaped part configured accommodate the rollers 9. Preferably, the ring-shaped part may have a groove in a shape complementary to a shape of the rollers 9, such that the rollers 9 have a slightly loose fit in the groove. The shape of the groove and the rollers 9 will be understood from the type of roller bearing 6 (e.g. a crossed roller bearing, a cylindrical roller, spherical roller, gear bearing, tapered roller, needle roller, CARB toroidal roller bearing, etc.) and/or from the configuration of the roller bearing 6 (e.g. a thrust bearing, a radial bearing, a linear-motion bearing, etc.). In some embodiments, the rollers 9 may be comprised in a cage provided in between the outer ring 5 and the inner ring 7. The cage may be configured to improve the stability of the rollers 9 and/or the roller bearing 6.

As described herein, the output flange 8 may be connected, e.g. rigidly connected, or fastened to a first part of the roller bearing 6, which may allow the output flange 8, preferably in addition to the spring plate 12, to rotate compared to the static environment and/or a housing of the clutch 1 or motor. For example, a first shaft, such as the output shaft, may be relatively moved or rotated compared to a second shaft, such as the input shaft. In preferred embodiments, the first part of the roller bearing 6 may be the inner ring 7 configured to be connected, e.g. rigidly connected, or fastened to the output flange 8. In some embodiments, the outer ring 5 may be configured to be connected or fastened to an external device or system, in the form of a motor or a gear unit connected to a motor. It can be understood that the gear unit may also be called a gear drive unit.

The hub 2 may be configured to receive external torque provided by an external source and transfer said received and/or provided external torque to the cam 10. The torque may be further transferred from the cam 10 to the spring plate 12, and eventually to the output flange 8 and a part of the roller bearing, preferably the inner ring 7, as will be explained in more detail below.

In some embodiments, the hub 2 may be coupled to a shaft by a connecting or fastening means, in the form of a key coupling, a key connection, a keyless coupling or a keyless connection. The hub 2 may be a clamping bushing configured to lock to the shaft. Preferably the hub 2 may be configured to lock the clutch to the shaft. Said shaft may extend through a center opening in any one or combination of the hub 2, the sliding bearing 4, the roller bearing 6, the output flange 8, the cam 10 and the spring plate 12.

Configurations of the clutch will be described in more detail with reference to FIGS. 2B, 2C, 3 and 4. FIG. 2B schematically shows a cross-sectional view of the clutch 1 where the hub 2, the cam 10, the roller bearing 6, the output flange 8 and the spring plate 12 are connected or fastened by means of the first and second connection or fastening means 3, 16. FIG. 2C schematically shows a cross-sectional view of a transmission element 13 in the clutch of FIG. 2B.

The clutch 1 further comprises a plurality of transmission elements 13 which are arranged in the angular direction between the spring plate 12 and the cam 10. The plurality of transmission elements 13 may be arranged in a plurality of groups of transmission elements 13, such as in at least 2 groups, at least 3 groups, at least 4 groups or at least 5 groups, preferably in 3 groups. The plurality of groups of transmission elements 13 may have a different number of transmission elements 13. For example, a first and second group have 4 transmission elements 13, and a third and fourth group have 6 transmission elements 13. Preferably, the number of transmission elements 13 in each group is the same (i.e., the total number of transmission elements 13 is evenly grouped among the plurality of groups of transmission elements 13).

As shown in FIG. 1, the cam 10 comprises a ring-shaped part having grooves 11 formed on a bottom surface of the ring-shaped part (i.e., facing the spring plate 12). The grooves 11 are arranged in the angular direction and configured to accommodate a top part of the transmission elements 13 (as shown in FIG. 2C). The grooves 11 may be arranged in a plurality of groups of grooves 11, such as in at least 2 groups, at least 3 groups, at least 4 groups or at least 5 groups, preferably in 3 groups of grooves 11. The plurality of groups may have a different number of grooves 11. For example, a first and second group have 4 grooves, and a third and fourth group have 6 grooves. Preferably, the number of grooves 11 in each group is the same (i.e., the total number of grooves 11 is evenly grouped among the plurality of groups). In preferred embodiments, the plurality of groups of grooves 11 may be similar to the plurality of groups of the transmission elements 13.

The ring-shaped part of the cam 10 may further have flat areas 15 which are arranged in the angular direction between subsequent grooves 11 (as shown in FIG. 1). The flat areas 15 may be arranged in a plurality of groups based on the arrangement of the grooves 11. For instance, the flat areas 15 may have a size based on the arrangement of the grooves 11 in the plurality of groups, such as a distance between the plurality of groups of the grooves 11 and/or a distance between the grooves 11 within a group of the plurality of groups of the grooves 11.

As shown in FIG. 2B, the sliding bearing 4 is provided at an interface between the hub 2 and the output flange 8. Said interface may comprise one or more surfaces of contact between the sliding bearing 4 and the output flange 8, the one or more surfaces may be extending in a radial direction and/or the axial direction. The sliding bearing 4 may be further provided at least a part of the interface between the hub 2 and the first part of the roller bearing 6, preferably at least a part of the inner ring 7 of the roller bearing 6. The at least part of the interface may comprise at least one surface of contact between the inner ring 7 and the sliding bearing 4, the at least one surface extending in the axial direction. The sliding bearing 4 may be configured to provide sliding friction, in the form of frictional force and/or frictional torque. The sliding bearing 4 may be further configured to provide support to any one or combination of the hub 2, the output flange 8, the roller bearing 6, the inner ring 7 and the shaft.

The spring plate 12 comprises top recesses formed on a top surface of the spring plate 12 (i.e., facing the cam 10). The top recesses are arranged in the angular direction and each top recess being configured to accommodate a bottom part of the transmission element 13 (as shown in FIG. 2C). Preferably, the top recesses may be arranged in a plurality of groups of top recesses similar to the plurality of groups of the transmission elements 13.

The transmission elements 13 may be in the form of balls, cylindrical rollers or spherical rollers. The grooves 11 and/or the top recesses may have a shape complementary to the transmission elements 13. Preferably, the transmission elements 13 and the top recesses may have a larger surface area of contact with each other in comparison to a surface area of contact between the transmission elements 13 and the grooves 11 (as shown in FIG. 2C).

The clutch 1 further comprises a plurality of springs 14 extending in the axial direction A and which are arranged in the angular direction between the spring plate 12 and the output flange 8. The plurality of springs 14 may be equally spaced apart. Alternatively, the plurality of springs 14 may be arranged in a plurality of groups, such as at least 2, at least 3, at least 4, at least 5 or at least 6 groups. The plurality of groups of springs 14 may be equally spaced apart from each other. The springs 14 within each group may be equally spaced apart.

As shown in FIG. 2B, the plurality of springs 14 may extend through the output flange 8 in the axial direction between the spring plate 12 and the first part of the roller bearing 6, preferably the inner ring 7 of the roller bearing 6. The spring plate 12 may comprise bottom recesses formed in a bottom part of the spring plate 12 (i.e., facing the output flange 8). Said bottom recesses may be arranged in the angular direction and each of the bottom recesses may be configured to accommodate a top part of a spring 14. Preferably, the arrangement of the bottom recesses may be complementary to the arrangement of the plurality of springs 14. The bottom recesses may be arranged in a plurality of groups, preferably similar to the plurality of groups of the springs 14.

Figure 3:
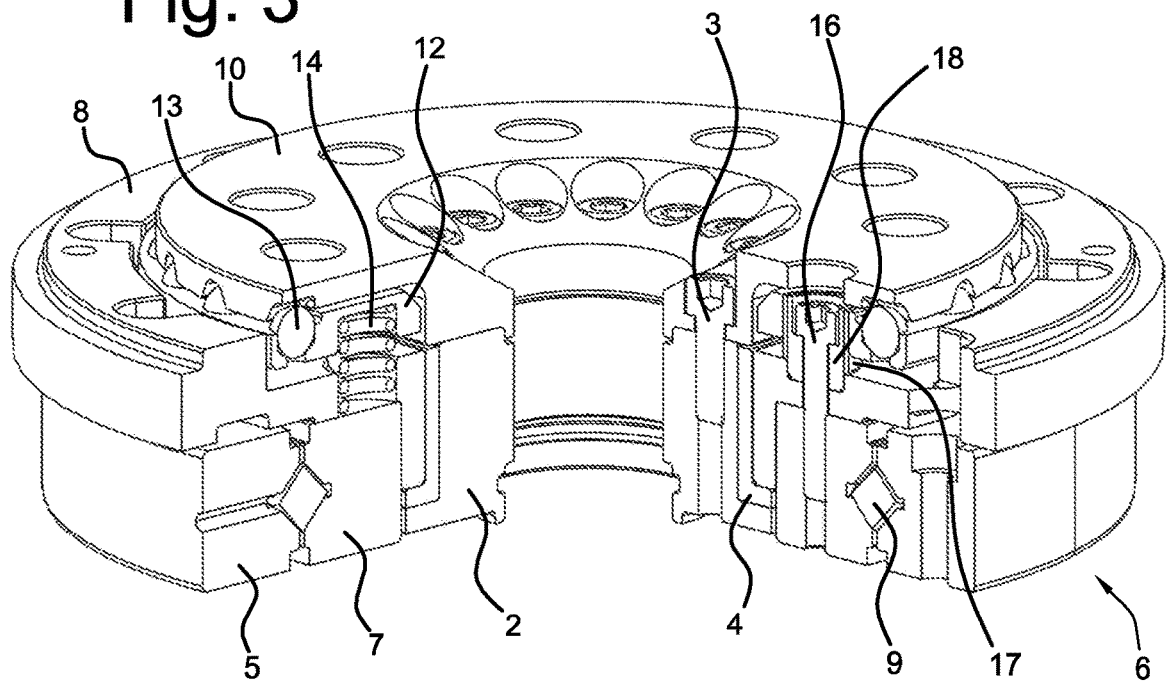
FIG. 3 schematically shows a cut-out perspective view of a clutch in an engaged state according to the present invention.
Figure 4:
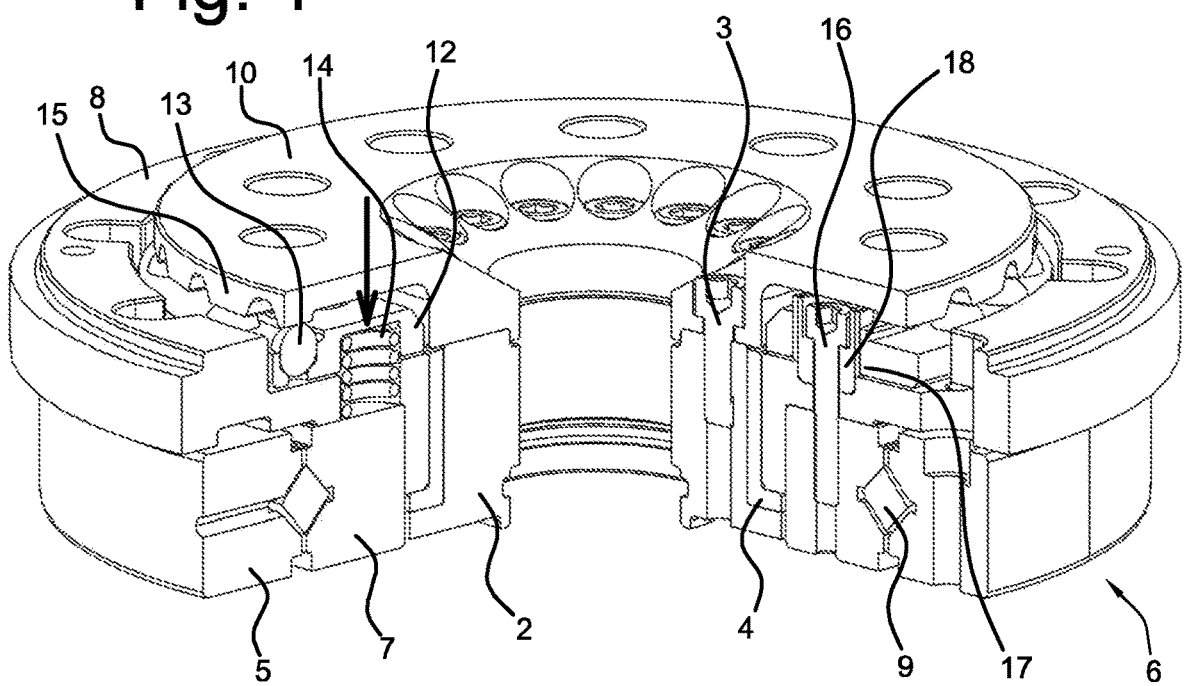
FIG. 4 schematically shows a cut-out perspective view of a clutch in a disengaged state according to the present invention.

FIGS. 3 and 4 schematically show a cut-out perspective view of the clutch in respectively an engaged state and disengaged state.

In the engaged state, the springs 14 push the spring plate 12 against the cam 10, against the ring-shaped part of the cam 10, in the axial direction to engage the cam 10 at a predetermined position. The predetermined position may be a user-selected position or a position of the cam 10 provided relative to the spring plate 12 at a present time.

Furthermore, in the engaged state shown in FIG. 3, the transmission elements 13 are provided, as described above, in spaces defined by the top recesses of the spring plate 12 and the grooves 11 of the cam 10, such that, during use, external torque is transmitted/transferred from the hub 2 to the output flange 8 via the cam 10 and the transmission elements 13. The external torque may be further transmitted/transferred via the spring plate 12. In the engaged state, the top part of the transmission elements 13 and the grooves 11 may create a connection, which transfers the external torque to the transmission elements 13 via the cam 10, preferably the ring-shaped part of the cam 10. Furthermore, the bottom part of the transmission elements 13 and the top recesses in the top part of the sliding plate 12 may create another connection, which transfers the external torque to the spring plate 12 via the transmission elements 13. Furthermore, the external power may be transferred to the output flange 8 via the spring plate 12 by means of the second connection or fastening means 16.

In the disengaged state shown in FIG. 4, the cam 10 and spring plate 12 are separated from each other. Furthermore, the transmission elements 13 are provided in the top recesses of the spring plate 12 and engage the ring-shaped part of the cam 10 between subsequent grooves 11. The transmission elements 13 may be moved onto the flat areas 15 of the cam 10, preferably of the ring-shaped part of the cam 10. As described herein, the clutch 1 may further comprise sliders 17 between the second connection or fastening means 16 and the sliding plate 12. The sliders 17 may be configured to allow the spring plate 12 to be displaced in the axial direction, preferably between the engaged and disengaged state.

During use, the clutch is configured to be moved from the engaged state to the disengaged state upon the external torque exceeding a total clutch threshold torque being the sum of a mechanical clutch torque threshold and a frictional clutch torque threshold. One way of calculating the mechanical clutch threshold torque $T_c$ can be according to:

$$T_c = R_c \tan(A) N K_l (L_0 - L_t),$$

where $R_c$ is a ball-cam radius, $A$ is a cam angle, $N$ is a number of parallel springs 14, $K_l$ is the linear spring stiffness, $L_0$ is the untensioned spring length, and $L_t$ is the tensioned spring length. For example, the external torque (provided to the outlet flange) may increase due to a robot arm, rigidly connected to the outlet flange, colliding with a substantially immovable object. It will be understood that the mechanical clutch threshold torque $T_c$ may be adjusted by changing at least one of a type or shape of the springs 14 (e.g. $L_0$ and/or $L_t$), a number of the springs 14 (e.g. $N$), a pre-compression of the springs (e.g. $K_l$), the arrangement of the transmission elements 13 (e.g. R) and pressure angle (e.g. A).

When used in the disengaged state, the clutch provides a predetermined friction torque through the sliding bearing 4, such that the predetermined friction torque prevents the output flange 8 and the hub 2 to rotate freely from each other. The predetermined friction torque results from friction between the transmission elements 13 and the surface of the cam 10. The friction between the top of the transmission elements 13 and the surface of the cam 10 may comprise friction between the top of the transmission elements 13 and the flat areas of the cam 10, preferably of the ring-shaped part of the cam 10. The friction between the top of the transmission elements 13 and the surface of the cam 10 may further comprise friction between the transmission elements 13 and a part of the grooves 11 of the cam 10, preferably of the ring-shaped part of the cam 10.

The predetermined friction torque through the sliding bearing 4 may be resulting from friction between the hub 2 and the sliding bearing 4, between the output flange 8 and the sliding bearing 4 and/or between the inner ring 7 of the roller bearing 6 and the sliding bearing 4.

The predetermined frictional torque may be adjustable by changing at least one of a type or shape of the springs 14, a number of the springs 14, a pre-compression of the springs 14, a friction coefficient of the sliding bearing 4 and a diameter of the sliding bearing 4. In one example, a larger number of springs can push the sliding plate 12 in the axial direction towards the cam 10 resulting in a larger friction between the transmission elements 13 and the surface of the cam 10, preferably between the transmission elements 13 and the flat areas of the cam 10 or the ring-shaped part of the cam 10. In another example, a larger diameter of the sliding bearing 4 may provide a larger sliding surface resulting in a larger friction between the sliding bearing 4 and the output flange 8, between the inner ring 7 of the roller bearing 6 and the sliding bearing 4 and/or between the hub 2 and the sliding bearing 4.

The predetermined frictional torque $T_f$ resulting from the friction between the transmission elements 13 and the cam 10 as well as due to the sliding bearing can be determined as follows:

$$T_f = (\mu_c R_c + \mu_s R_s) N K_l (L_0 - L_t)$$

where, $\mu_c$ is the friction coefficient of the ball-cam, $\mu_s$ is the friction coefficient of the sliding bearing 12, $R_c$ is the radius of the ball-cam 10 and $R_s$ is the radius of the sliding bearing 4. Here, it is assumed that the plurality of springs 14 is a single group of springs used to determine or obtain both the friction between the transmission elements 13 and the cam 10 as well as due to the sliding bearing 4.

In embodiments, the plurality of springs 14 is two groups of springs, a first group for determining or obtaining the cam friction (i.e., between the transmission elements 13 and the cam 10) and a second group for determining or obtaining the friction due to the sliding bearing 4. Therefore, the predetermined frictional torque $T_f$ is then determined as the sum of both friction torques (i.e., from the first group of springs and the second group of springs). The first group of springs and the second group of springs may have different linear spring stiffness (i.e., $K_l$) and/or number of springs (i.e., N) and/or spring displacement (i.e., the difference between the free spring length $L_0$ and the loaded spring length $L_t$). The advantage of the embodiments using a single group of springs is providing compactness.

Thus, the predetermined frictional torque $T_f$ resulting from the friction between the transmission elements 13 and the cam 10 as well as due to the sliding bearing can also be determined as follows:

$$T_f = (\mu_c R_c N_c K_{lc}(L_{0c} - L_{tc}) + \mu_s R_s N_s K_{ls}(L_{0s} - L_{ts}))$$

where, $\mu_c$ is the friction coefficient of the ball-cam, $\mu_s$ is the friction coefficient of the sliding bearing 12, $R_c$ is the radius of the ball-cam 10 and $R_s$ is the radius of the sliding bearing 4, where $N_c$ is the number of springs in the first group of springs, and where $N_s$ is number of springs in the second group of springs, where $K_{lc}$ is the linear spring stiffness of the first group of springs in the plurality of springs 14 relating to the cam friction, and where $K_{ls}$ is the linear spring stiffness of the second group of springs in the plurality of springs 14 relating to the sliding bearing friction, and where $(L_{0c} - L_{tc})$ is the average spring displacement of the first group of springs in the plurality of springs 14 relating to the cam friction, and where $(L_{0s} - L_{ts})$ is the average spring displacement of the second group of springs in the plurality of springs 14 relating to the sliding bearing friction.

In the engaged state, a total clutch torque threshold may be determined as follows: $T_c + T_f$. When or if the torque, for e.g. during a collision, is larger than this total clutch torque, the clutch will disengage and the residual torque will be $T_f$. An example value for the cam angle is 60°. Furthermore, the ratio of $R_c$ and $R_s$ may be approximately $R_c/R_s \approx 2$. Assuming $\mu_c = \mu_s/2 = 0.25$, the ratio residual torque versus total clutch torque may be approximately $T_f/(T_f + T_c) \approx 20\%$. The ratio of $R_c$ and $R_s$ as well as $\mu_c$ and $\mu_f$ may be changed if another ratio of the residual torque versus the total clutch torque is required. The absolute values of the cam-ball and friction torque may scale linearly with the spring stiffness, the number of springs 14 and/or the compression of the springs 14.

The clutch 1 may allow that a relative angle between the cam 10 and the output flange 8 upon re-engagement remains the same as it was before the moving the clutch into the disengaged state. In FIG. 1, the transmission elements 13 are clustered in 3 groups, allowing for a unique return position every 120° degrees.

The clutch 1 may further comprise an end-stop integrated in a second part of the roller bearing 6, preferably in the outer ring 5 of the roller bearing 6. The end-stop may be configured to limit a rotation of the cam 10 with respect to the output flange 8 to a predetermined angle and allow said springs 14 to re-engage the spring plate 12 and the cam 10 at a predetermined position. The end-stop may be in the form of an internal pin. The predetermined angle may be between −180° and 180°, −175° and 175°, −170° and 170°, or −165° and 165°.

In embodiments, at least one of the transmission elements 13, the grooves 11 and the top recesses of the sliding plate 12 may be arranged in a plurality of groups based on a size of at least one of the spring plate 12 and the cam 10, on a size and a number of at least one of the transmission elements 13, the grooves 11 and the top recesses of the sliding plate 12, and/or on the predetermined position. Preferably a number of the transmission elements 13 and the grooves 11 in each group of the plurality of groups may be the same. Even more preferably, a number of the transmission elements 13, the grooves 11 and the top recesses of the sliding plate 12 in each group of the plurality of groups may be the same.

The hub 2 and/or the output flange 8 may be provided in a metal alloy material, such as Aluminium (A7075 T6). The sliding bearing 4 may be provided in copper or copper alloys, such as brass. The cam 10 may be provided in a metal alloy material, such as Steel (C45E). In some embodiments, the material of the cam 10 may be similar to that of the hub 2. The sliding plate 12 may be provided in a metal alloy material similar to that of the cam 10 and/or the hub 2. The roller bearing 6 or the components thereof may be provided in a steel material, such as Stainless steel (AISI 316, AISI 440C, etc.), Chrome steel (SAE 52100), etc.

The clutch 1 described herein may be used in protecting a robot, preferably a high-speed robot, from torque overload (e.g. due to a collision of the robot) in applications such as a position-based application.

Figure 5:
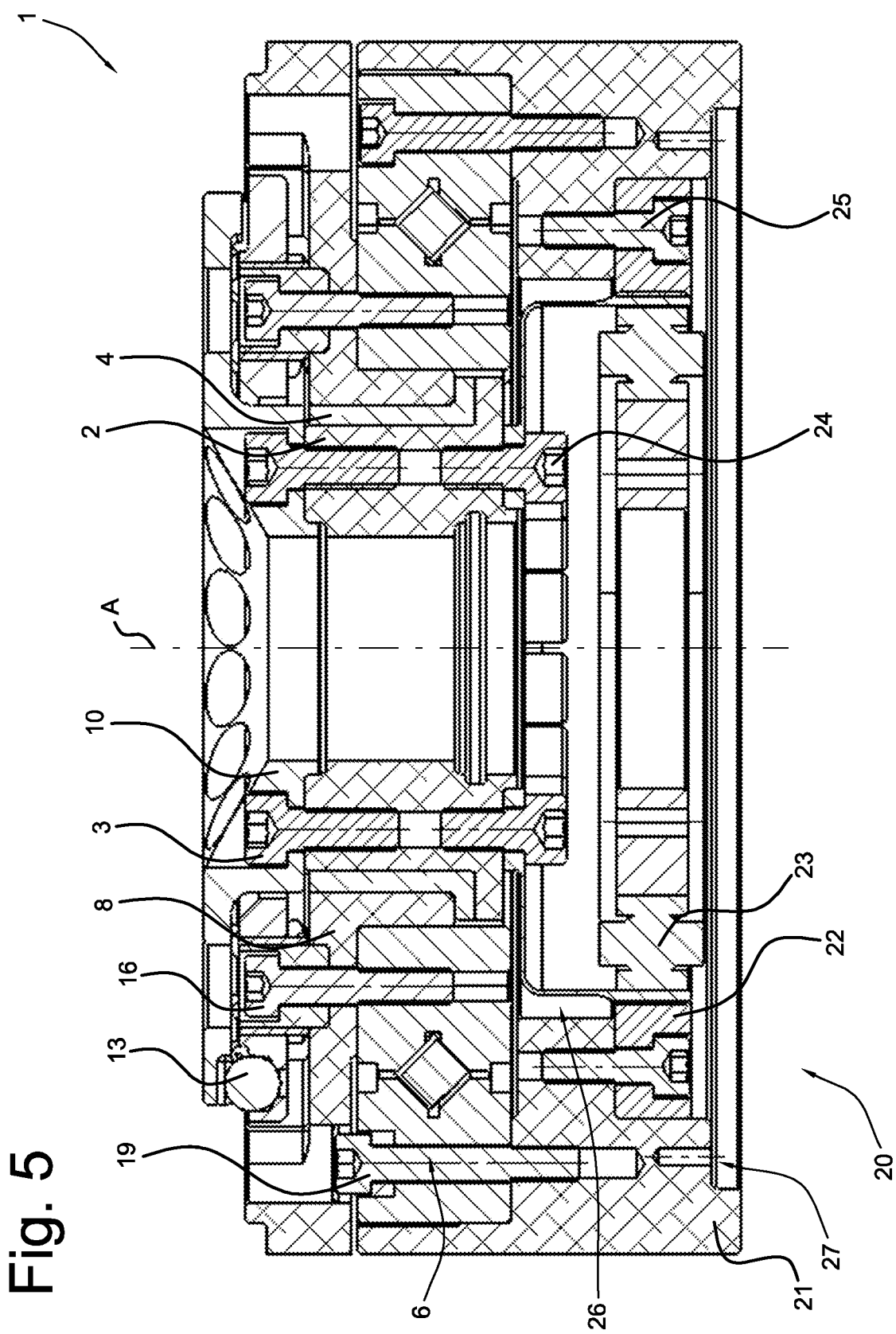
FIG. 5 schematically shows a cross-sectional view of part of an industrial robot comprising the clutch according to the present invention.

The clutch 1 described herein may be used in a control algorithm comprising the steps of determining when the torque at the cam 10 exceeds a predetermined torque threshold, and moving the clutch into the disengaged state, as described herein. Preferably, the transmission elements 13 are moved out of the grooves 11 and onto flat areas 15 arranged in the angular direction between subsequent grooves, and disengage the spring plate 12 and the cam 10 from each other. In an embodiment, the control algorithm further comprises the step of providing in the disengaged state a predetermined friction torque between the hub 2 and the output flange 8 resulting from friction between the transmission elements 13 and the surface of the cam 10, between the sliding bearing 4 and the output flange 8 and/or between the hub 2 and the sliding bearing 4, such that the predetermined friction torque prevents the output flange 8 and the hub 2 to rotate freely from each other Embodiments of a high-speed industrial robot according to the present invention will be described with reference to FIG. 5. FIG. 5 schematically shows a cross-sectional view of part of a high-speed industrial robot comprising the clutch 1 as described herein with reference to FIGS. 1-4.

The clutch 1 as described herein may be comprised in a high-speed industrial robot capable of moving one or more axes. Preferably, at least one of said one or more axes comprises the clutch 1. At least one of said one or more axes can have maximum rotational speeds of up to 280°/s, 360°/s, 420°/s, 460°/s, 560°/s or 750°/s.

The high-speed industrial robot comprises a gear unit 20 connected to the hub 2 and a motor connected to the gear unit 20, said motor being configured to provide torque to the roller bearing 6 through the gear unit 20. The hub 2 may transfer/transmit the torque to the output flange 8 as described herein.

As shown in FIG. 5, the high-speed industrial robot further comprises a gear unit 20 and a motor (not shown) to be connected to the gear unit 20. The clutch 1 may be connected, e.g. rigidly connected, or fastened to the motor via an actuator housing 21 that is connected to clutch 1 via third connection or fastening means 19, in the form of a bolt/screw connection with a bolt/screw stud, a bolt/screw connection with a through bolt/screw, a bolt/screw connection with a through bolt/screw and a nut. As shown in FIG. 1, the roller bearing 6 comprises holes extending through the outer ring 7 of the roller bearing 6, arranged in an angular direction and configured to accommodate bolt connections through said holes of the outer ring 7 of the roller bearing 6. In an embodiment, the third connection or fastening means 19 may be accessible for adjustment (loosening and/or tightening) at top side of the cam 10 (as shown in FIG. 5). For example, a tail of the bolts/screws may be inserted into the holes of the outer ring 7 in the axial direction towards the actuator housing 21, the bolts/screws being capable of adjustment at an end of the cam 10 where a head of the bolts/screws is visible (shown in FIG. 2A).

The gear unit 20 or actuator housing 21 may comprise first holes or openings arranged in the angular direction and configured to accommodate bolts/screws through said first holes of the gear unit 20 or actuator housing 21. The first holes or opening may extend at least partially through the gear unit 20 or the actuator housing 21.

The gear unit 26 may comprise a circular spline 22, wave generator 23 and a flexspline 26. The gear unit 20 or a rotatable part of the gear unit 20 may be further connected, e.g. rigidly connected, or fastened to the hub 2 via the flexspline 26 and fourth connection or fastening means 24, in the form of a bolt/screw connection with a bolt/screw stud, a bolt/screw connection with a through bolt/screw, a bolt/screw connection with a through bolt/screw and a nut. As described above, the hub 2 comprises holes extending through the tubular body, arranged in an angular direction and configured to accommodate bolt connections through said holes of the hub 2. The first and fourth connection or fastening means 3, 24 may have a similar length. FIG. 5 shows the fourth connection or fastening means 24 being shorter in length than the first connection or fastening means 3, so as to not interfere with each other.

The flexspline 26 may comprise first holes arranged in the angular direction and configured to accommodate bolts/screws through said first holes of the flexspline 26. The holes or openings of the flexspline 26 may be complementary to the holes or openings of the hub 2, for example having a similar diameter and/or arrangement. In an embodiment, the fourth connection or fastening means 24 may be accessible for adjustment (loosening and/or tightening) at a side of the gear unit 20. For example, a tail of the bolts/screws may be inserted into the holes of the hub 2 in the axial direction towards the hub 2, the bolts/screws being capable of adjustment at an end of the flexspline 26 where a head of the bolts/screws is visible (as shown in FIG. 5).

The circular spline 22 may be connected, e.g. rigidly connected, or fastened to the actuator housing 21 via fifth connection or fastening means 25, in the form of a bolt/screw connection with a bolt/screw stud, a bolt/screw connection with a through bolt/screw, a bolt/screw connection with a through bolt/screw and a nut. The circular spline 22 and actuator housing 21 may each comprise second holes extending there through, respectively. The second holes may be arranged in an angular direction and configured to accommodate bolt connections through said holes of the circular spline 22 and the actuator housing 21.

Although not shown in FIG. 5, the motor may comprise a rotor and a stator. The stator may be connected, e.g. rigidly connected, or fastened to the actuator housing 21 via motor connection or fastening provision 27. The rotor is configured to provide torque to the hub 2 through the gear unit 20, for e.g. by coupling the rotor to the rotatable part of the gear unit 20. connected, e.g. rigidly connected, In an embodiment, the gear unit 20 may be a strain wave gearing, preferably a harmonic drive.

The industrial robot may be used in a control algorithm comprising the step of actively braking (including stopping) the motor when the torque at the cam 10 exceeds a predetermined torque threshold. The clutch is thus moved from the engaged state to the disengaged state, as described herein. The higher the motor braking torque, the faster the motor inertia can be slowed down and the smaller the angular position difference between the clutch and the motor.

The industrial robot may be used in a control algorithm comprising the step of controlling the position of the motor and gear unit with the clutch in the disengaged state such that the clutch can move from the disengaged state to the engaged state. The control algorithm may further comprise the step of braking, and preferably stopping, the motor as described herein.

LIST OF REFERENCE SIGNS

1. Clutch
2. Hub
3. First connection or fastening means (Hub screws)
4. Sliding bearing
5. Outer ring
6. Roller bearing
7. Inner ring
8. Output flange
9. Roller
10. Cam
11. Grooves
12. Spring plate
13. Transmission elements
14. Springs
15. Flat areas
16. Second connection or fastening means (Output flange screws)
17. Sliders
18. Support units
19. Third connection or fastening means (Clutch screws)
20. Gear unit
21. Actuator housing
22. Circular Spline
23. Wave Generator
24. Fourth connection or fastening means (Flexspline screws)
25. Fifth connection or fastening means (Circular Spline screws)
26. Flexspline
27. Motor connection or fastening provision

The invention claimed is:

1. A clutch comprising:
a hub extending in an axial direction and a cam connected to the hub, said cam comprising a ring-shaped part having grooves formed on a bottom surface of the ring-shaped part, said grooves being arranged in the angular direction and each groove being configured to accommodate a top part of a transmission element;
a spring plate having recesses formed on a top surface of the spring plate, said recesses being arranged in the angular direction and each recess being configured to accommodate a bottom part of the transmission element;
an output flange comprising a ring-shaped part configured to accommodate the spring plate;
a plurality of transmission elements arranged in the angular direction between the spring plate and the cam;
a plurality of springs arranged in the angular direction between the spring plate and the output flange, allowing the spring plate to move axially with respect to the output flange;
one or more sliders configured to allow the spring plate to be displaced in the axial direction; and
a sliding bearing provided at an interface between the hub and the output flange, wherein the clutch is configured to be changed between:

a first state in which the springs push the spring plate against the cam in the axial direction to engage the cam at a predetermined position and in which the transmission elements are provided in spaces defined by the recesses of the spring plate and the grooves of the cam such that, during use, torque is transmitted from the hub to the output flange via the cam and the transmission elements, and
a second state in which the transmission elements are provided in the recesses of the spring plate and engage the ring-shaped part of the cam between subsequent grooves and in which the cam and spring plate are separated from each other,
wherein the clutch is configured to be moved from the first state to the second state upon the torque exceeding a clutch threshold torque during use, and to provide in the second state a predetermined friction torque between the hub and the output flange resulting from friction between the transmission elements and the surface of the cam and/or between the sliding bearing and the output flange such that the predetermined friction torque prevents the output flange and the hub to rotate freely from each other,
wherein the predetermined friction torque is at least 1% of the clutch threshold torque.

2. The clutch according to claim 1, wherein the clutch is further configured to be moved from the second state to the first state upon a relative movement of the hub and the output flange during use such that the transmission elements are accommodated within the grooves and the plurality of springs are configured to push the spring plate against the cam.

3. The clutch according to claim 1, wherein the predetermined frictional torque is adjustable by changing at least one of a type or shape of the springs, a number of the springs, a pre-compression of the springs, a friction coefficient of the sliding bearing and a diameter of the sliding bearing.

4. The clutch according to claim 1, wherein the plurality of springs extend through the output flange in the axial direction between the spring plate and a first part of a roller bearing, said first part being connected to the output flange.

5. The clutch according claim 4, wherein the roller bearing is a cross roller bearing.

6. The clutch according to claim 1, wherein the transmission elements and the grooves are arranged in a plurality of groups based on a size of the spring plate and the cam, on a size and a number of the transmission elements and the grooves, and/or on the predetermined position, preferably a number of the transmission elements and the grooves in each group of the plurality of groups is the same.

7. The clutch according to claim 1, wherein the hub is a clamping bushing configured to lock the clutch to a shaft.

8. The clutch according to claim 1, wherein the transmission elements are balls.

9. A robot capable of moving one or more axes, at least one of said one or more axes comprising a clutch according to claim 1, said robot further comprising:
a gear unit connected to the hub; and
a motor connected to the gear unit, said motor being configured to provide torque to the hub through the gear unit,
wherein the output flange of each clutch is connected to the relevant axis.

10. The robot according to claim 9, wherein the gear unit is a harmonic drive.

11. The predetermined friction torque of claim 1 is from 5% to 35% of the clutch threshold torque.

12. The predetermined friction torque of claim 1 is 25% of the clutch threshold torque.

13. A method for protecting a robot in a position-based application from torque overload, the method comprising:
provinding a clutch comprising
- a hub extending in an axial direction and a cam connected to the hub, said cam comprising a ring-shaped part having grooves formed on a bottom surface of the ring-shaped part, said grooves being arranged in the angular direction and each groove being configured to accommodate a top part of a transmission element;
- a spring plate having recesses formed on a top surface of the spring plate, said recesses being arranged in the angular direction and each recess being configured to accommodate a bottom part of the transmission element;
- an output flange comprising a ring-shaped part configured to accommodate the spring plate;
- a plurality of transmission elements arranged in the angular direction between the spring plate and the cam;
- a plurality of springs arranged in the angular direction between the spring plate and the output flange, allowing the spring plate to move axially with respect to the output flange;
- one or more sliders configured to allow the spring plate to be displaced in the axial direction; and
- a sliding bearing provided at an interface between the hub and the output flange, determining when the torque at the cam exceeds a predetermined torque threshold;
moving the clutch into a disengaged state.

14. The method of claim 13 further comprising:
providing in the disengaged state a predetermined friction torque between the hub and the output flange resulting from friction between the transmission elements and a surface of the cam, such that the predetermined friction torque prevents the output flange and the hub to rotate freely from each other.

15. The method of claim 13 further comprising:
controlling the position of the motor and gear unit with the clutch in the second state such that the clutch can move from the second state to the first state.

16. The method of claim 13 further comprising:
actively braking the motor when the torque provided to the outlet flange exceeds a predetermined torque threshold, causing the clutch to move from the first to the second state.

17. The method of claim 13 wherein:
the clutch is configured to be moved from the first state to the second state upon the torque exceeding a clutch threshold torque during use, and
providing in the second state a predetermined friction torque between the hub and the output flange resulting from friction between the transmission elements and the surface of the cam and/or between the sliding bearing and the output flange such that the predetermined friction torque prevents the output flange and the hub to rotate freely from each other.

18. The method of claim 17 wherein the predetermined friction torque is at least 1% of the clutch threshold torque.

* * * * *